(12) United States Patent
Stewart et al.

(10) Patent No.: US 9,941,698 B2
(45) Date of Patent: Apr. 10, 2018

(54) FAST RESPONSE ACTIVE REACTIVE POWER (KVAR) COMPENSATOR

(71) Applicant: Edge Electrons Limited, Hong Kong (HK)

(72) Inventors: Neal George Stewart, Hong Kong (HK); Wing Ling Cheng, Hong Kong (HK)

(73) Assignee: Edge Electronics Limited, Hong Kong (HK)

( * ) Notice: Subject to any disclaimer, the term of this patent is extended or adjusted under 35 U.S.C. 154(b) by 0 days.

(21) Appl. No.: 15/538,662

(22) PCT Filed: Jan. 6, 2016

(86) PCT No.: PCT/CN2016/070254
§ 371 (c)(1),
(2) Date: Jun. 22, 2017

(87) PCT Pub. No.: WO2016/110254
PCT Pub. Date: Jul. 14, 2016

(65) Prior Publication Data
US 2017/0373499 A1 Dec. 28, 2017

Related U.S. Application Data

(60) Provisional application No. 62/100,074, filed on Jan. 6, 2015, provisional application No. 62/100,076, filed on Jan. 6, 2015.

(51) Int. Cl.
*H02J 3/18* (2006.01)
*H02M 5/04* (2006.01)

(52) U.S. Cl.
CPC ............... *H02J 3/18* (2013.01); *H02M 5/04* (2013.01)

(58) Field of Classification Search
CPC ..................................... H02J 3/18; H02M 5/04
See application file for complete search history.

(56) References Cited

U.S. PATENT DOCUMENTS

| 5,886,888 A * | 3/1999 | Akamatsu | H02J 3/01 |
| | | | 363/65 |
| 6,075,350 A * | 6/2000 | Peng | H02J 3/1814 |
| | | | 323/207 |
| 9,407,133 B1 * | 8/2016 | Alexander | H02M 1/12 |
| 9,819,279 B2 * | 11/2017 | Stewart | H02M 5/22 |
| 2003/0151259 A1 * | 8/2003 | Feddersen | F03D 7/0224 |
| | | | 290/44 |

(Continued)

*Primary Examiner* — Jue Zhang
(74) *Attorney, Agent, or Firm* — Idea Intellectual Limited; Margaret A. Burke; Sam T. Yip

(57) ABSTRACT

Legacy automatic variable capacitor KVAR compensation systems typically use either electromechanical devices such as relays or contactors of various forms and types to switch the selected capacitors in and out of the electrical system under some form of electronic control. These systems are slow and discontinuous in their ability to closely regulate the exact value of compensatory capacitance needed to compensate the variable and rapidly changing reactive power KVAR in the electrical power transmission and distribution networks. The present invention provides a fast response active KVAR compensator based on a variable transimpedance topology.

3 Claims, 3 Drawing Sheets

(56) References Cited

U.S. PATENT DOCUMENTS

| | | | |
|---|---|---|---|
| 2006/0114642 A1* | 6/2006 | Liu ........................... | C25B 1/04 361/500 |
| 2015/0060209 A1* | 3/2015 | Nikander .............. | H02J 3/1892 187/276 |
| 2016/0218635 A1* | 7/2016 | Stewart ................. | H02M 5/293 |

* cited by examiner

FAST RESPONSE ACTIVE REACTIVE POWER (KVAR) COMPENSATOR

CROSS REFERENCE OF RELATED APPLICATION

The present application is a national phase application of the international patent application PCT/CN2016/070254 filed on Jan. 6, 2016 which claims priority to the U.S. Provisional Patent Application No. 62/100,074, filed Jan. 6, 2015, and U.S. Provisional Patent Application No. 62/100,076, filed Jan. 6, 2015, the disclosures of which are incorporated herein by reference in their entirety.

FIELD OF THE INVENTION

The present invention generally relates to electrical power generation and distribution. Particularly, the present invention relates to methods and devices for alternating current (AC) reactive power (KVAR) compensation in AC electrical power generation and distribution.

BACKGROUND

In AC electrical power distribution networks, the optimized operating conditions for maximum energy efficiency in the usage, transmission, and delivery of AC electrical power is when the voltage and the current are closely in phase, and the reactive power (KVAR) is close to zero. However, with the addition of reactive loads and inherent reactive components such as capacitance and inductance in the transmission and distribution system, the AC current in the system can be phase-shifted with respect to the voltage waveform. This creates power quality issues that affect the efficient transmission and usage of the delivered electrical power. The degradation in power quality due to the increasing reactive power value is measured by the amount of phase angle shift of the current behind (lagging) or ahead (leading) with respect to the voltage waveform. Reactive power value is derived by the following equation.

$$KVAR = \sqrt{KVA^2 - KW^2} \quad (1)$$

where KVAR is the total reactive power, KVA is the total apparent power, and KW is real power.

Noted that only the real power KW is useful for productive consumption, whereas the reactive power KVAR is wasted power. But since the total apparent power KVA is made up of KW and KVAR as per the equation above, both power components are be generated, transmitted, and delivered. As such, an increasing phase shift of the AC current with respect to the voltage waveform, which means increasing value of reactive power KVAR will translate into a significant efficiency decrease in the electrical power system.

This problem is well known and there are various legacy methods of compensating and removing reactive power KVAR by introducing reactive components at various points within the electrical system. Typically these are capacitors introduced in shunt across the electricity supply lines to cancel the generally lagging current due to magnetic elements such as electric motors, fluorescent ballasts, transformers, etc.

This has been traditionally achieved by adding fixed and variable capacitor banks in shunt across the electrical power transmission and distribution system. If a known and reproducible KVAR problem is stable, then a fixed capacitor KVAR compensation bank can be permanently installed at the point to be compensated. If the reactive power KVAR is changing, then automatic variable capacitor banks that can respond, under electronic controls and KVAR sensing, and switch in the amount of capacitance needed to compensate for the level of KVAR at any given time.

These legacy automatic variable capacitor KVAR compensation systems typically use either electromechanical devices such as relays or contactors of various forms and types to switch the selected capacitors in and out of the electrical system under some form of electronic control. In more recent versions of KVAR compensation systems, semiconductor switching devices, such as triodes for alternating current (TRIACs) and silicon-controlled rectifiers (SCRs), and electromechanical switching devices have been seen in use.

Because of the need to switch discrete component capacitors in and out of circuit by various switching means, these legacy reactive power KVAR compensators are slow and discontinuous in their ability to closely regulate the exact value of compensatory capacitance needed to compensate the variable and rapidly changing reactive power KVAR in the electrical power transmission and distribution networks.

SUMMARY

In addressing the abovementioned shortcoming of the legacy automatic variable capacitor KVAR compensation systems, the present invention provides a fast response active KVAR compensator. In various embodiments in accordance to the present invention, the fast response active KVAR compensator is based on a variable transimpedance topology.

In one preferred embodiment, the fast response active KVAR system employs the specific AC variable voltage topology as described in the U.S. Pat. No. 9,148,058 issued Sep. 29, 2015 and the same in the PCT International Patent Application No. PCT/CN2014/089721 filed Oct. 28, 2014; the disclosures of which are incorporated herein by reference in their entirety. In another preferred embodiment, the fast response active KVAR system employs the specific AC variable voltage topology as described in the U.S. patent application Ser. No. 14/565,444 filed Dec. 10, 2014 and the same in the PCT International Patent Application No. PCT/CN2014/093475 filed Dec. 10, 2014; the disclosures of which are incorporated herein by reference in their entirety.

BRIEF DESCRIPTION OF THE DRAWINGS

Embodiments of the invention are described in more detail hereinafter with reference to the drawings, in which.

DETAILED DESCRIPTION

In the following description, methods and systems for compensating reactive power (KVAR) in electrical power generation and distribution networks and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
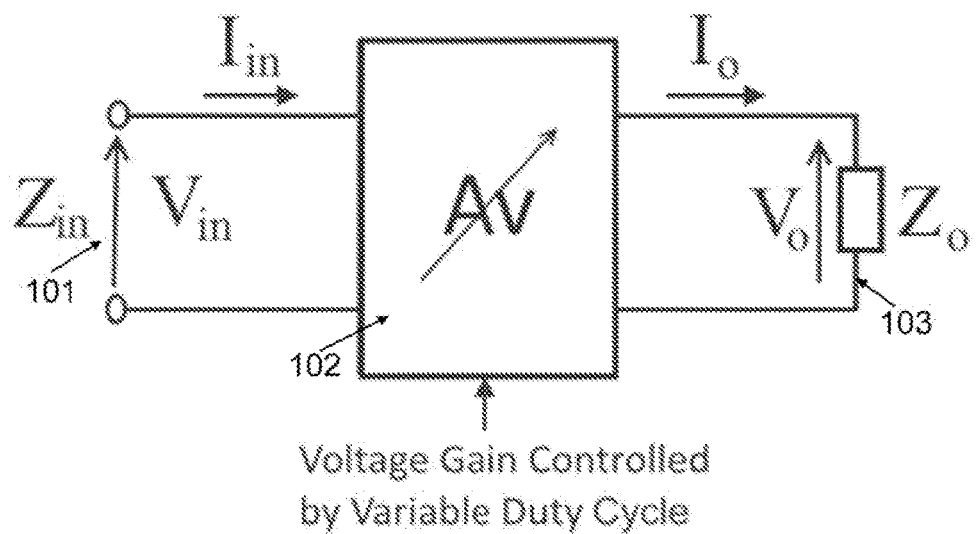
FIG. 1 depicts a logical diagram illustrating a general variable transimpedance topology.

FIG. 1 depicts a logical diagram illustrating a general variable transimpedance topology and it is used herein to show the general operating principle of a transimpedance system in which the value of an output impedance ($Z_o$) across the output 103 of the alternating current (AC) amplifier 101 is transferred and reflected onto the input 102 of the AC amplifier. The value of this transferred input impedance ($Z_{in}$) is related the output impedance ($Z_o$) by the gain of the controlled gain AC amplifier ($A_v$). Thus, if the gain of the AC amplifier (Ag) is controllable and variable, not only a controlled transimpedance can be generated across the input 102 from the fixed output impedance ($Z_o$) across the output 103, the apparent impedance ($Z_{in}$) across the input 102 can be smoothly and accurately controlled with a very fast response. The quickness of change of the apparent impedance ($Z_{in}$) across the input 102 is due to the fact that it only depends upon the response speed of the control electronics.

Still referring to FIG. 1. The relationship between the apparent input impedance ($Z_{in}$) and the output impedance ($Z_o$) is governed by the following equation.

$$Z_{in} = \frac{1}{Av^2} \times Z_o \qquad (2)$$

In specifying a particular value of the output impedance ($Z_o$), either a capacitor across the output 103 with a fixed capacitance value ($C_o$) or an inductor across the output 103 with a fixed inductance value ($L_o$) can be used. Then, the relationship between the reflected apparent input capacitance ($C_{in}$) and the output capacitance ($C_o$) is governed by the following equation.

$$C_{in} = Av^2 \times C_o \qquad (3)$$

And the relationship between the reflected apparent input inductance ($L_{in}$) and the output inductance ($L_o$) is governed by the following equation.

$$L_{in} = \frac{L_o}{Av^2} \qquad (4)$$

It can be seen that by varying the gain of the AC amplifier ($A_v$), the apparent value of reflected capacitance ($C_{in}$) or reflected inductance ($L_{in}$) at the input of the ac amplifier can be varied over a range not only continuously without discrete steps, but also with a very rapid response limited only by the response speed of the control electronics.

Figure 2:
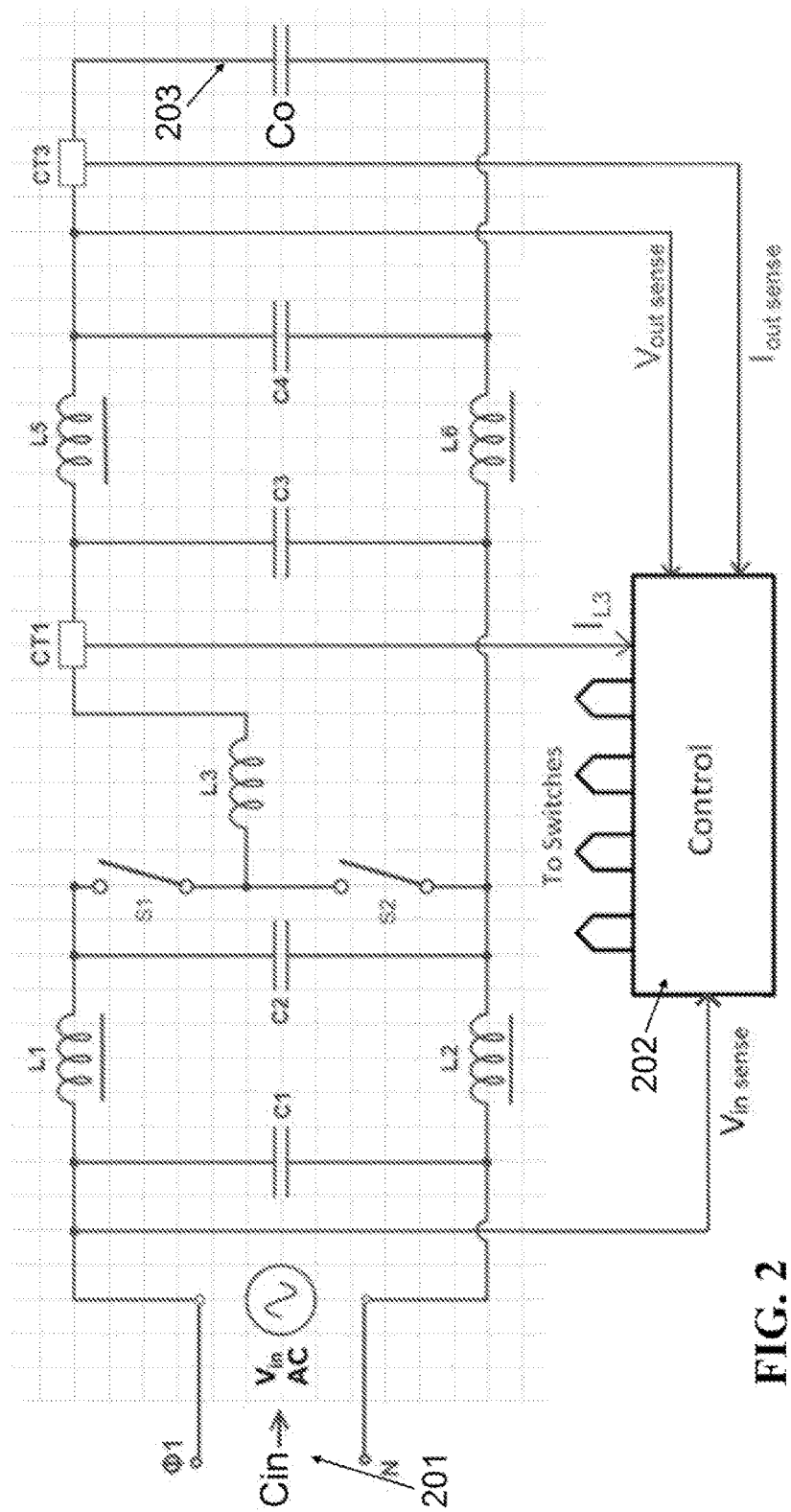
FIG. 2 depicts a circuit diagram of an embodiment of the fast response active KVAR compensator in accordance to the present invention.

FIG. 2 depicts a circuit diagram of an embodiment of the fast response active KVAR compensator in accordance to the present invention. In this first preferred embodiment, the fast response active KVAR compensator utilizes the buck section with an output capacitor 203 of fixed capacitance ($C_o$) across the output of the AC series buck-boost voltage regulator electronic circuitry described in the U.S. Pat. No. 9,148,058 and the same in the PCT International Patent Application No. PCT/CN2014/089721 to achieve the KVAR compensation function.

Still referring to FIG. 2. As the gain of the AC variable voltage topology is changed by the electronic control module 202 in response to the level of KVAR at the input 201, the value of the apparent input capacitance ($C_{in}$) across the input 201 is accurately adjusted to compensate and cancel out the reactive power KVAR. This is done without discrete capacitor steps, thus the apparent input capacitance ($C_{in}$) adjustment is achieved in smooth and continuous manner, and the response time depends only upon the response speed of the control electronics of the electronic control module 202.

Although it is described here with the preferred embodiment utilizing the buck section of the AC series buck-boost voltage regulator electronic circuitry described in the U.S. Pat. No. 9,148,058 and the same in the PCT International Patent Application No. PCT/CN2014/089721 to achieve the KVAR compensation function, it should be obvious to an ordinarily skilled person in the art to use the boost section of the aforesaid AC series buck-boost voltage regulator electronic circuitry instead of the buck section.

Also, although it is described here with the preferred embodiment utilizing a capacitor of fixed capacitance across the output of the buck section of the AC series buck-boost voltage regulator electronic circuitry described in the U.S. Pat. No. 9,148,058 and the same in the PCT International Patent Application No. PCT/CN2014/089721 to compensate for a lagging KVAR, it should be obvious to an ordinarily skilled person in the art to substitute the aforesaid capacitor with an inductor of fixed inductance to compensate for a leading KVAR.

Figure 3:
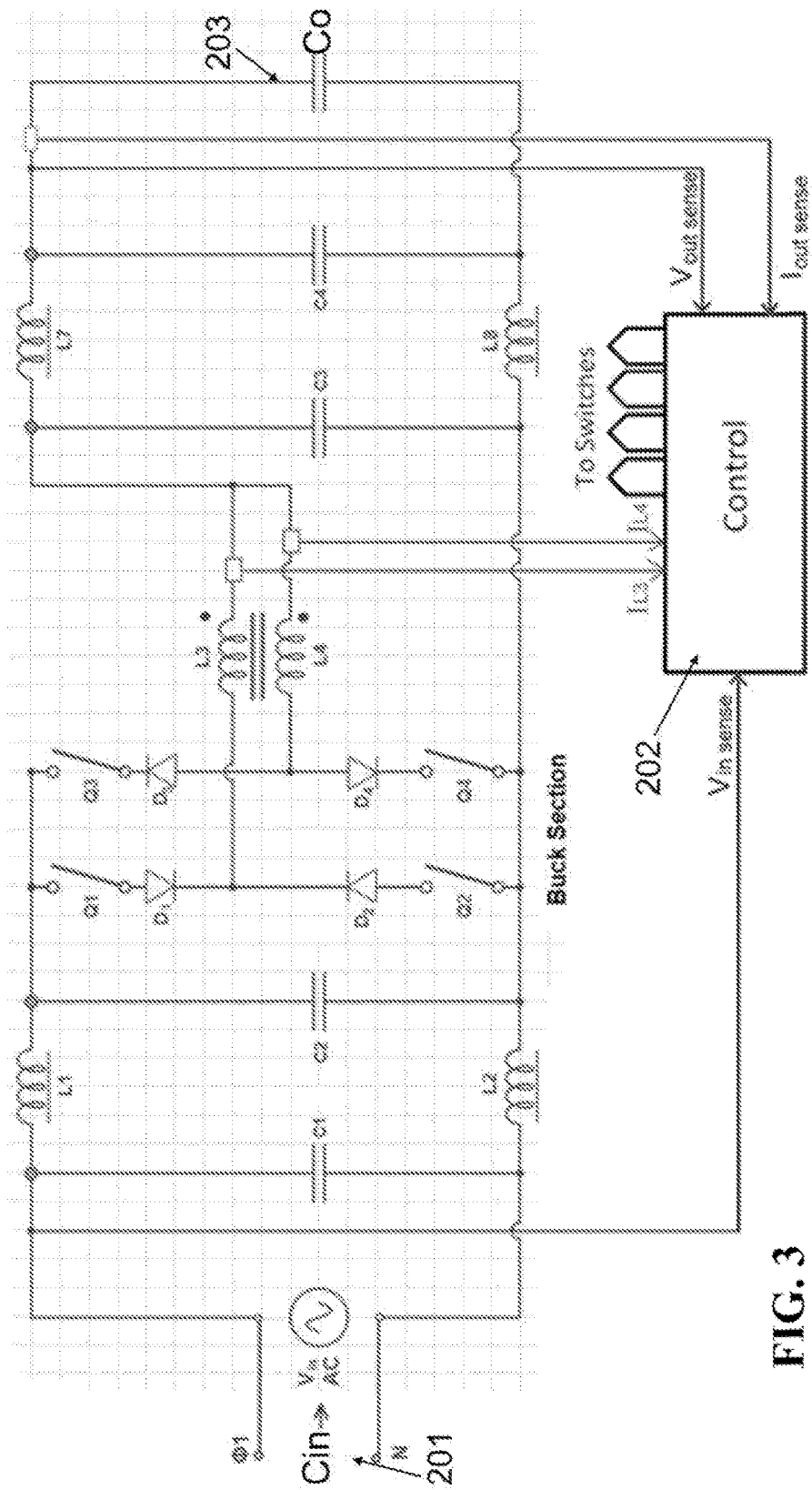
FIG. 3 depicts a circuit diagram of another embodiment of the fast response active KVAR compensator in accordance to the present invention.

FIG. 3 depicts a circuit diagram of another embodiment of the fast response active KVAR compensator in accordance to the present invention. In this second preferred embodiment, the fast response active KVAR compensator utilizes the buck section with an output capacitor 303 of fixed capacitance ($C_o$) across the output of the AC series buck-boost voltage regulator electronic circuitry described in the U.S. patent application Ser. No. 14/565,444 and the same in the PCT International Patent Application No. PCT/CN2014/093475 to achieve the KVAR compensation function.

Still referring to FIG. 3. As the gain of the AC variable voltage topology is changed by the electronic control module 302 in response to the level of KVAR at the input 301, the value of the apparent input capacitance ($C_{in}$) across the input 301 is accurately adjusted to compensate and cancel out the reactive power KVAR. This is done without discrete capacitor steps, thus the apparent input capacitance ($C_{in}$) adjustment is achieved in smooth and continuous manner, and the response time depends only upon the response speed of the control electronics of the electronic control module 302.

Although it is described here with the preferred embodiment utilizing the buck section of the AC series buck-boost voltage regulator electronic circuitry described in the U.S. patent application Ser. No. 14/565,444 and the same in the PCT International Patent Application No. PCT/CN2014/093475 to achieve the KVAR compensation function, it should be obvious to an ordinarily skilled person in the art to use the boost section of the aforesaid AC series buck-boost voltage regulator electronic circuitry instead of the buck section.

Also, although it is described here with the preferred embodiment utilizing a capacitor of fixed capacitance across the output of the buck section of the AC series buck-boost voltage regulator electronic circuitry described in the U.S. patent application Ser. No. 14/565,444 and the same in the PCT International Patent Application No. PCT/CN2014/093475 to compensate for a lagging KVAR, it should be obvious to an ordinarily skilled person in the art to substitute the aforesaid capacitor with an inductor of fixed inductance to compensate for a leading KVAR.

Any ordinarily skilled person in the art can apply the inventive principles described herein to any poly-phase AC systems, such as three-phase electrical systems, without departing from the scope and spirit of the invention.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A reactive power (KVAR) compensator for compensating leading or lagging KVAR in alternating current (AC) distribution systems, the KVAR compensator comprising:
   a first and a second independently controllable AC bidirectional switches;
   a first power inductor;
   a first current transformer for generating a first power inductor current direction data signal indicating the first power inductor current direction;
   an output capacitor with a fixed capacitance or an output inductor with a fixed inductance; and
   a control circuitry for receiving an AC input voltage, an AC output voltage, and the first power inductor current direction data signal, measuring a KVAR value, and setting a variable gain to generate an apparent impedance across the AC input for compensating the KVAR.

2. A reactive power (KVAR) compensator for compensating leading or lagging KVAR in alternating current (AC) distribution systems, the KVAR compensator comprising:
   a first unipolar paths, comprising:
      a first half-bridge, comprising a first and a second rectifiers connected in series with a first and a second independently controllable unipolar switches respectively,
      a first power inductor, and
      a first current transformer for generating a first power inductor current direction data signal indicating the first power inductor current direction;
   a second unipolar paths, comprising:
      a second half-bridge, comprising a third and a forth rectifiers connected in series with a third and a forth independently controllable unipolar switches respectively,
      a second power inductor, and
      a second current transformer for generating a second power inductor current direction data signal indicating the second power inductor current direction;
   an output capacitor with a fixed capacitance or an output inductor with a fixed inductance; and
   a control circuitry for receiving an AC input voltage signal, an AC output voltage signal, the first power inductor current direction data signal, and the second power inductor current direction data signal, measuring a KVAR value, and setting a variable gain to generate an apparent impedance across the AC input for compensating the KVAR.

3. A reactive power (KVAR) compensator for compensating leading or lagging KVAR in alternating current (AC) distribution systems, the KVAR compensator comprising:
   a first unipolar paths, comprising:
      a first half-bridge, comprising a first and a second unipolar switching devices,
      a first power inductor, and
      a first current transformer for generating a first power inductor current direction data signal indicating the first power inductor current direction;
   a second unipolar paths, comprising:
      a second half-bridge, comprising a third and a forth unipolar switching devices,
      a second power inductor, and
      a second current transformer for generating a second power inductor current direction data signal indicating the second power inductor current direction;
   an output capacitor with a fixed capacitance or an output inductor with a fixed inductance; and
   a control circuitry for receiving an AC input voltage signal, an AC output voltage signal, the first power inductor current direction data signal, and the second power inductor current direction data signal, measuring a KVAR value, and setting a variable gain to generate an apparent impedance across the AC input for compensating the KVAR.

* * * * *